United States Patent

Venetta

[11] 3,813,209
[45] May 28, 1974

[54] PREHEATING OF METAL SCRAP

[76] Inventor: Henry J. Venetta, 96 Howland Springs Rd., Warren, Ohio 44484

[22] Filed: Feb. 26, 1973

[21] Appl. No.: 336,032

[52] U.S. Cl. ............... 432/11, 266/335, 432/134, 432/241
[51] Int. Cl. ............................................ F27b 3/06
[58] Field of Search ............ 432/11, 137, 134, 241, 432/; 266/335

[56] References Cited
UNITED STATES PATENTS

| | | | |
|---|---|---|---|
| 2,623,740 | 12/1952 | Frost et al. | 432/134 |
| 2,948,630 | 8/1960 | Holm | 432/134 X |
| 3,556,500 | 1/1971 | Fritz | 266/33 |
| 3,656,735 | 6/1972 | Eliot | 266/335 |
| 3,667,747 | 6/1972 | Graybill et al. | 266/335 |
| 3,758,267 | 9/1973 | Berk | 432/134 |

*Primary Examiner*—John J. Camby
*Attorney, Agent, or Firm*—Michael Williams

[57] ABSTRACT

Metal scrap is deposited in a predetermined amount and in a generally uniform bed on the receiving end of a conveyor. The bed of scrap is moved into a tunnel furnace for preheating. A plurality of burners are supported on the top wall of the furnace, each burner mixing fuel, such as gas or oil, with air, and the mixture is ignited. The burner products, at high heat, jet from the respective burner at high velocity and down onto the scrap and penetrate the latter so as to quickly heat the scrap to required temperature. Smoke and fumes issuing from heated scrap are entrained by the jetting burner products and are largely consumed thereby.

The improved apparatus, and the method of operating the same, result in economies in capital investment, operating costs and plant space required, since the scrap is so quickly preheated that successive batches may be preheated and deposited into a charging bucket and subsequently delivered to a melt furnace, without any appreciable heat loss.

14 Claims, 6 Drawing Figures

PREHEATING OF METAL SCRAP

BACKGROUND AND SUMMARY

A commonly used method in the preheating of scrap consisted of loading an amount of scrap into a charging bucket and heating the scrap in various manners. One method included a hood which was assembled over the open top of the charging bucket, the hood having burners which directed flame and products of combustion down on the scrap. Another included forcing hot gases upwardly in the scrap. These methods, although frequently used, did not represent an acceptable degree of efficiency since charging buckets normally hold about one to five tons of scrap, all fairly tightly compressed, thus making it difficult to effect any uniformity in the heating of the scrap.

Attempts have been made to heat scrap which is distributed along a conveyor surface, but this attempt followed the theory that heat rises and thus the burner products were forced through an elongated plenum chamber which was disposed in relation underlying the conveyor, with the latter having a multitude of openings permitting upward escape of the burner products through the scrap. This attempt was not efficient and resulted in considerable difficulty with the conveyor surface.

I have discovered that if burners are placed in the top wall of a tunnel furnace and jet their burner products at high velocity downwardly on the scrap distributed along a conveyor surface, the scrap will be quickly and uniformly heated because the jetting burner products will penetrate the scrap. An additional advantage is obtained in that the smoke and fumes rising from the preheated scrap are entrained in the downwardly jetting burner products and are largely consumed. In the above mentioned processes, this smoke consumption is not effected.

The improved apparatus is of a short length, as compared to the length of conveyors in previous attempts, and thus reduces initial capital outlays. Because of the increased efficiency of my improved apparatus, scrap may be preheated at high heat and held in the tunnel furnace at reduced heat until the melt furnace calls for another charge of scrap. Also, because of increased efficiency, the scrap may be heated in batches which are successively deposited in the same charging bucket for transportation of the melt furnace.

By maintaining the temperature in the burner area of the tunnel furnace at automatic ignition temperature of the fuel and air mixture issuing from the burners, explosions caused by flame-out and subsequent ignition, are avoided. This also eliminates the need for flame safety controls, such as flame rods and/or ultra violet scanners.

DESCRIPTION OF THE DRAWINGS

In the drawings accompanying this specification and forming part of this application, there is shown, for purpose of illustration, an embodiment which my invention may assume, and in these drawings.

DESCRIPTION OF THE PREFERRED EMBODIMENT

Figure 1:
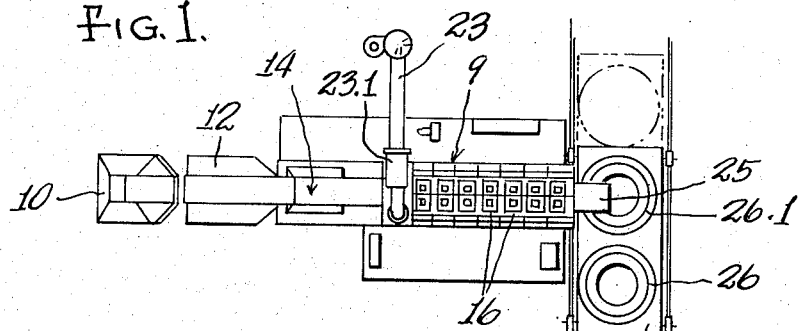
FIG. 1 is a small scale, largely schematic plan view illustrating apparatus embodied in my invention, showing the apparatus adapted to charge preheated scrap into a charging bucket.
Figure 2:
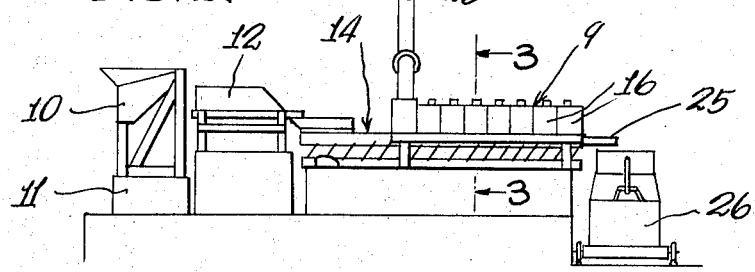
FIG. 2 is a side view of the apparatus shown in FIG. 1.
Figure 3:
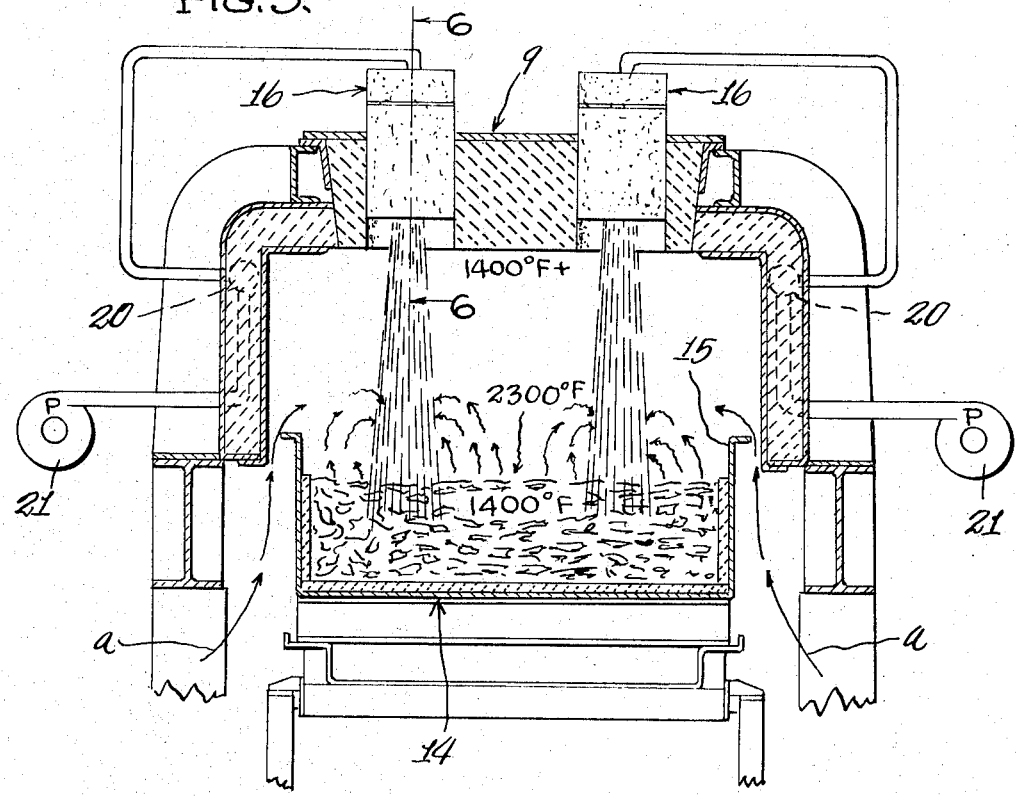
FIG. 3 is an enlarged, fragmentary sectional view, corresponding generally to the line 3—3 of FIG. 2.

In the embodiment disclosed in FIGS. 1 through 3, metal scrap is deposited into a hopper 10. A scale 11 supports this hopper and enables the operator to ascertain the correct weight of a required scrap charge.

When the correct amount of scrap is deposited in the hopper 10, further feeding is halted and the hopper is tilted to deliver its scrap to a flow feed conveyor 12. This conveyor may be of the shaker feed type and its purpose is to feed the scrap to the supporting surface of a conveyor 14 which may be of a suitable design.

Because of the high heat involved in the preheating of scrap, the conveyor 14 is preferably of the shaker feed type shown in my U.S. Pat. No. 3,721,519. This type of conveyor has an elongated trough 15 which has one end adjacent to the flow feed conveyor to receive scrap fed from the latter. The scrap is delivered to the trough 15 so that it is distributed thereon in substantially level manner and the trough is vibrated longitudinally so as to move the scrap along the trough.

A tunnel furnace 9 closely overlies a considerable length of the trough 15. The top and side walls of the furnace are constructed to resist heat, and heating means are supported from the top wall of the furnace.

Preferably, the heating means comprises one row or a plurality of rows of fuel burners 16 and may be of the type designated as Tempest burners, as manufactured by North American Mfg. Co. These burners use either natural or propane gas or oil, as a fuel, and this fuel is mixed with air, preferably with a slightly excess fuel ratio, and at relatively low pressures, such as a pound pressure. The body of the burner may be refractory tile and the air is admitted to the combustion chamber 17 (see FIG. 6) in an annular manner to circumscribe the gas flowing to the combustion chamber. Suitable valves 18 and 19, of standard design, are disposed in the air and gas lines to regulate the mixture of air and gas.

Figure 6:
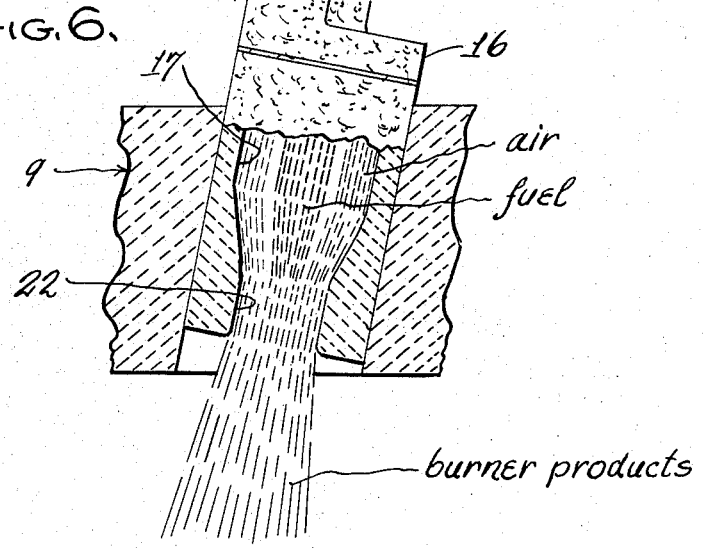
FIG. 6 is an enlarged, fragmentary sectional view corresponding generally to the line 6—6 of FIG. 3.

The combustion air is preheated in a novel manner, utilizing the heat of the walls of the tunnel furnace, and/or the heat from the exhaust stack 23, thereby increasing the overall fuel efficiency of the system. In the embodiment herein disclosed, a double row of burners is shown, the burners being arranged in pairs transversely of the furnace and preferably angled (as seen in FIG. 6) in a manner that provides momentum to the flow of any gases in a direction toward the exhaust stack. The furnace walls are formed with conduits 20, which are like heat exchangers, or such conduits may be disposed outside the furnace walls but in heat transfer relation therewith. A blower 21 is disposed in each side of the furnace and is adapted to blow outside air through the conduits 20, where it is heated and then led to the respective burners. As an alternate, a commercial exhaust-gas-to-air heat exchanger may be disposed within the stack, with lines for heated air to the air intake of the burners.

The air and gas is ignited, such as by means of a spark igniter, and passes through a constricting opening 22 (see FIG. 6) which acts as a Venturi tube to increase the velocity of the burner products. The burner products jet from the burner a very high velocity to strike the scrap therebelow with a high penetration as suggested in FIG. 3. Furnace gases, caused by the intense heating of the scrap, are entrained with the jetting burner products and are thus consumed so that the scrap is heated with little or no smoke issuing from the furnace stack 23. Outside air may flow around the side of the trough 15, as shown by the arrows $a$ in FIG. 3 to assist in combustion of the fumes and smoke issuing from the heated scrap. The stack may be provided with an optional after-burner 23.1 and, if needed, this burner may be energized to completely consume any smoke which may otherwise issue from the stack.

The heated scrap is discharged from the discharge end 25 of the conveyor 14 and into a charging bucket 26. Heretofore, cold scrap was deposited in the charging bucket and heated therein in various ways. However, this was time consuming and did not result in even distribution of heat in the scrap. In use of my improved method and apparatus, the scrap is uniformly heated in a relatively short time, since it is in a fairly level bed on the conveyor and the downwardly jetting burner products provide deep penetration of the scrap.

As shown in FIG. 2, two charging buckets 26 and 26.1 are carried by a car 30 which is movable along tracks in a direction at right angles to the feed from the conveyor 14, so that one or the other of the buckets may be charged with heated scrap. In FIG. 1, the bucket 26.1 is in position to receive heated scrap. When a predetermined amount of scrap is deposited in the bucket 26.1, the car 30 is moved so that the bucket 26 will be aligned with the conveyor 14 to receive heated scrap therefrom. The bucket 26.1 is therefore clear of the conveyor and may be lifted from the car by any suitable hoist mechanism and moved to the melt furnace (not shown). Both buckets may be of the usual drop bottom type so that when either overlies the melt furnace opening, the bottom of the bucket may be opened so that heated scrap is dropped into the melt furnace.

In the manufacture of steel, even in the most modern plants, space is always at a premium and efforts are constantly being made to reduce the required space or to utilize the space more efficiently. My improved method and apparatus makes it possible to reduce the space required for preheating of scrap while increasing the efficiency of the scrap heating process.

In most melt furnace operations, the furnace has a predetermined charging rate and therefore requires a certain amount of preheated scrap at definite time intervals. In accordance with my improved process, the required weight of scrap is delivered to the hopper 10, the scale being available to indicate when the hopper has been correctly filled. This scrap charge is then deposited into the shaker feed conveyor 12 and uniformly distributed on the trough 15 of the shaker conveyor 14. The latter conveyor is then actuated and the scrap charge is moved to position within the tunnel furnace. When this condition is reached, operation of the conveyor 14 is halted so that the scrap remains within the furnace, and the burners 16 are automatically caused to operate at high heat. The burner products jetting from the burners penetrate deep into the scrap and quickly heat the same.

When the scrap has been heated to a predetermined temperature, the burners may be automatically reduced to a low fire pilot setting and the conveyor operated to feed the scrap to a charging bucket. However, because it is possible to quickly heat the scrap, the melt furnace may not be ready for another charge of scrap. The scrap could be fed to the charging bucket immediately after reaching temperature since it has been uniformly heated and would lose only an insignificant amount of heat when stored in the charging bucket. However, it is preferred to switch the burners 16 from high heat to a lower heat and maintain the shaker conveyor 14 inoperative until just a short time before the melt furnace requires another charge of scrap. This decreases even more the loss of heat from the scrap.

For the purpose of a better understanding of my improved process, it may be assumed that the melt furnace requires a predetermined charge (say about 5,000 lbs.) every 10 minutes. The amount of scrap is loaded into the hopper 10 and fed to the shaker conveyor 14 so that it has a bed height of about 12 inches. The conveyor 14 moves the bed of scrap to within the tunnel furnace 9 and is then stopped, and the burners 16 turned on to high heat. As an example, the burners on high heat may have a gas input of about 450 cubic feet per ton of scrap. The burner products jetting from the burners penetrate the scrap and quickly bring it up to the required process temperature which is usually in the range of about 800° to 1,400°F. The heating time may be approximately 6 minutes in the example given. The burners are then automatically turned to low heat while the shaker conveyor 14 remains inoperative. At low heat, the gas input would be reduced and in the given example this may be reduced by about one-sixth, or about 75 cubic feet per ton of scrap. In my improved process, the total inputs of gas and air are reduced, but still in the excess fuel to air ratio, to prevent oxidation of the scrap.

The remaining 4 minutes of time may be alotted to holding the preheated scrap while it is still in the furnace, moving the scrap by means of the conveyor 14 to the charging bucket, and moving the charging bucket to the melt furnace. In this way, very little heat is lost.

The same short-length conveyor and tunnel furnace may be utilized with even greater efficiency where the melt furnace charge size is greater. As a comparison with the example given above, if the melt furnace requires 10,000 lbs of scrap every 12 minutes, two separate batches of scrap, each weighing 5,000 lbs may be delivered to the tunnel furnace in the manner mentioned above, and a batch heated for about 6 minutes and then immediately delivered to one of the charging buckets. Immediately thereafter, the other batch may be delivered to the tunnel furnace and heated at high heat for about 6 minutes, and then delivered to the same charging bucket. Thus, one bucket may be in position for charging, while the other, which has been charged, may be moved to the furnace, unloaded, and returned to the car 30. In this manner, the low heat time is eliminated or substantially reduced to further maximize the efficiency of my improved apparatus and process. Other multiples of batch heating may be effected in the same manner.

Figure 4:
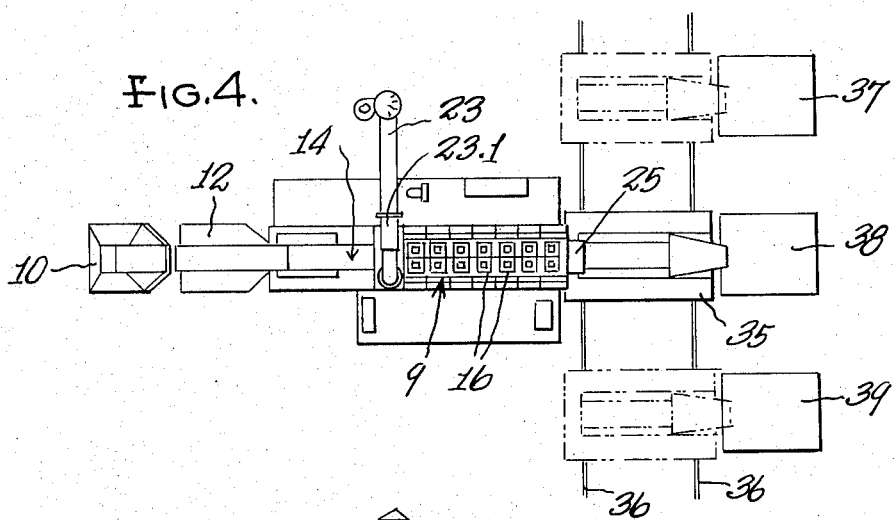
FIG. 4 is a small scale, largely schematic plan view showing the apparatus of FIG. 1 adapted to charge preheated scrap into a traversing indexing, shaker-feed charging car.
Figure 5:
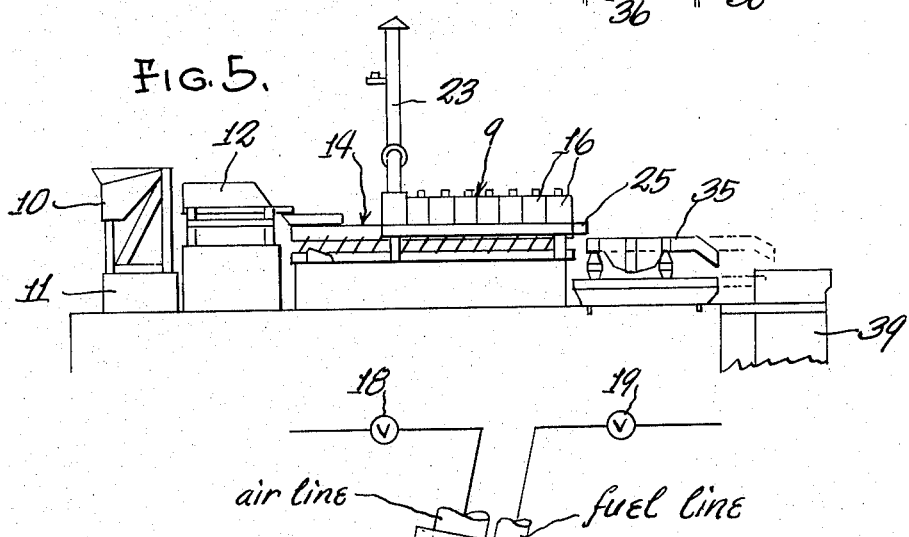
FIG. 5 is a side view of the apparatus shown in FIG. 4.

FIGS. 4 and 5 illustrate my invention applied to delivery of heated scrap to a traversing, indexing, shaker-feed charging car 35. This car is movable along tracks 36 for alignment with the discharge end 25 of the conveyor 14. Heated scrap may be delivered into the car, as it was previously delivered to the charging buckets. Three furnaces 37, 38, and 39 are serviced by the charging car, the centrally located furnace being in line with the conveyor 14 so that the charged car may be merely extended, in known manner, to deliver heated scrap to this furnace. After such delivery, the car is returned from extended relation and another batch of heated scrap is delivered thereto, and this time the car may be moved and indexed with one or the other of the furnaces 37, 39, and extended to deliver its charge thereinto. In this manner, the short-length conveyor and tunnel furnace would be operating at even greater efficiency, since low heat time would be eliminated or drastically reduced.

Another important feature of my invention resides in safety features which result from the improved process and apparatus in that dangers, such as explosions and the like, are largely eliminated. One safety feature resides in the fact that the temperature in the furnace adjacent to the burners is always maintained at automatic ignition regardless whether the burners are operating at high heat, reduced heat, or a lower pilot setting. The reason for this is that at reduced heat or pilot setting, the volumes of fuel and air are reduced in the same excess fuel ratio, thereby maintaining high flame temperature at the burner to thus maintain the temperature in the furnace adjacent the burners at 1,400° F. plus. This eliminates the need for flame safety controls which were heretofore required by safety standards. Such safety controls included flame rods and/or ultra violet scanners. These controls were not only expensive but also required so much maintenance that many operators removed them and thus were faced with dangers of explosion in case of a flame-out and subsequent flame ignition.

As seen in FIG. 3, at high heat the temperature at the scrap level may be in the range of 2,300°F., and the temperature in the scrap, for example, may range between the temperature of the scrap as it enters the furnace (say about 60°F) to about 1,400°F after the scrap has been in the furnace a predetermined time. Smoke and fumes from the heated scrap are entrained in the jetting burner products and are largely consumed thereby. The velocity of the burner products, at high heat, is sufficient to cause such products to penetrate the scrap and thus quickly heat the same.

At low heat, the volumes of fuel and air are reduced to maintain the same slightly excess fuel ratio. Since the volumes have been reduced, the velocity of the burner products is also reduced. However, because the ratio is maintained, a hot flame will still exist at the burner so as to maintain the automatic ignition temperature in the top of the furnace. This condition also exists when the burners are at pilot setting.

I claim:

1. Apparatus for preheating metal scrap, comprising:

a conveyor having a horizontal surface upon which scrap is positioned in substantially level manner, said conveyor having a delivery end whereat scrap is loaded thereon, and a discharge end, a tunnel furnace through which said scrap is moved by said conveyor, burner means within said furnace, said burner means being of the high velocity type and having the flame outlet thereof arranged relative to the scrap on the conveyor so that the burner products jet from the outlet at high velocity in a direction normal to the scrap therebelow and close enough to penetrate the same, whereby to quickly and evenly heat said scrap, and means at the discharge end of said conveyor for receiving the heated scrap.

2. The construction according to claim 1 wherein said furnace has an exhaust stack, and wherein said burner means is so disposed that the downwardly jetting burner products are at a slight angle inclined toward said exhaust stack to provide momentum to any exhaust gases in a direction toward said stack.

3. The construction according to claim 1 wherein said conveyor is of the shaker feed type, including an elongaged horizontally disposed trough, and means for feeding scrap to the delivery end of said conveyor and depositing it on said trough in a substantially level bed.

4. The construction according to claim 3, wherein means are provided to halt shaking operation of said conveyor for a predetermined time when said scrap is disposed within said tunnel furnace, and means for operating said burner means at high heat and velocity during the time operation of said conveyor is halted and said bed of scrap is within said furnace so that the downwardly jetting burner products strike said bed of scrap at high velocity and penetrate the same.

5. The construction according to claim 4, wherein at high heat said air and fuel are at a high volume with an excess fuel ratio, and further including means operable to change said burner means to low heat by reducing the total volume of fuel and air delivered to said burner means while maintaining the same excess fuel ratio, said means to reduce being operable after said predetermined time and while operation of said conveyor is still halted, to substantially maintain the temperature of the preheated scrap.

6. The construction according to claim 5, wherein operation of said conveyor is effected to deliver said heated scrap to scrap receiving means after said burner means has been on low heat for a predetermined amount of time.

7. The construction according to claim 6, wherein the means to receive preheated scrap is one of a pair of melt-furnace charging buckets, said buckets being mounted on a car which is movable transversely of said conveyor at the discharge end thereof, whereby one bucket may be charged with scrap while the other is moved to and from the melt furnace.

8. The construction according to claim 6, wherein the means to receive preheated scrap is a transversing shaker-feed charging car that is movable to one of a plurality of furnaces.

9. The construction according to claim 1, wherein said burner means combines fuel and air and ignites the same to provide said burner products, and wherein means are provided to preheat the air flowing to said burner means, the air preheating means in heat transfer relationship with hot gases of the furnace.

10. The method of preheating metal scrap for charging into a melt furnace wherein said furnace requires preheated metal scrap charged into it at predetermined time intervals, comprising:
depositing scrap in a generally even bed on the surface of a conveyor,
operating said conveyor to move said bed of scrap into a tunnel furnace which has burner means in its upper portion operable at high heat to direct burner products downwardly onto said scrap at high velocity,
maintaining said bed of scrap within said tunnel furnace for a period of time less than said predetermined time interval, and thereafter discharging the preheated scrap into a receiving member for transportation to said melt furnace.

11. The method of claim 10, wherein the ratio of fuel to air at high heat of said burner means is such that the fuel is in excess,
wherein said burner means is operated at high heat for a portion of said predetermined time interval while said bed of scrap is maintained within said tunnel furnace,
and wherein said burner means is operated at a reduced heat for another portion of said predetermined time interval while said bed of scrap is maintained within said tunnel furnace, at reduced heat the total volume of fuel and oil being reduced while the excess ratio of fuel to air is maintained.

12. The method of claim 10, wherein said melt furnace requires a predetermined amount of preheated scrap at predetermined time intervals, including,
depositing a portion of said predetermined amount of scrap on said conveyor and moving it to said tunnel furnace for preheating said subsequent discharge into a melt-furnace charging bucket,
and thereafter depositing the remaining portion of said predetermined amount of scrap on said conveyor and moving it to said tunnel furnace for preheating and subsequent discharge into the same charging bucket, whereby the length of said conveyor and tunnel furnace may be held to a minimum.

13. The method of preheating metal scrap in a tunnel furnace wherein burner means is located in the top wall of said furnace and directs its burner products downwardly onto said scrap at high velocity, said burner means mixing fuel and air with an excess fuel ratio and igniting the mixture to form the burner products, the improvement for reducing explosions which may be caused by flameouts, comprising,
maintaining the temperature within the furnace adjacent to said top wall at a degree high enough to insure automatic ignition of the mixture issuing from said burner means.

14. The method according to claim 13, and further including operating said burner means at various heats, which includes changing total volumes of fuel and air while maintaining said fuel and air mixture at an excess fuel ratio to maintain a hot flame within said furnace adjacent to said top wall to thereby maintain automatic ignition temperature.

* * * * *

Disclaimer 3,813,209.—*Henry J. Venetta*, Warren, Ohio. PREHEATING OF METAL SCRAP. Patent dated May 28, 1974. Disclaimer filed Mar. 12, 1975, by the inventor.

Hereby enters this disclaimer to claims 1, 3, 4 and 10 of said patent.

[*Official Gazette July 22, 1975.*]